Patented Feb. 24, 1948

2,436,416

UNITED STATES PATENT OFFICE 2,436,416

Δ³-TETRAHYDROBENZALDOL

Joseph E. Bludworth, Corpus Christi, Tex., and Donald P. Easter, Washington, D. C., assignors to Celanese Corporation of America, a corporation of Delaware No Drawing. Original application January 22, 1944, Serial No. 519,352. Divided and this application April 25, 1946, Serial No. 664,981

1 Claim. (Cl. 260—598)

This invention relates to novel organic compounds and relates more particularly to Δ³-tetrahydrobenzaldol and to the derivatives thereof.

This application is a division of United States Application S. No. 519,352, filed January 22, 1944, now Patent No. 2,410,007.

An object of our invention is the preparation of Δ³-tetrahydrobenzaldol.

Another object of our invention is the utilization of Δ³-tetrahydrobenzaldol as an intermediate in the synthesis of various organic compounds.

Other objects of our invention will appear from the following detailed description.

The reaction of acrolein with butadiene in accordance with the Diels-Alder condensation yields Δ³-tetrahydrobenzaldehyde,

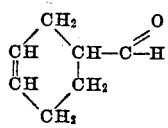

This cyclic aldehyde is quite reactive and, as a starting material may be employed as a fertile source of novel and valuable synthetic organic materials.

We have now discovered that the aldol condensation of Δ³-tetrahydrobenzaldehyde yields the aldol condensation product Δ³-tetrahydrobenzaldol having the following structural formula:

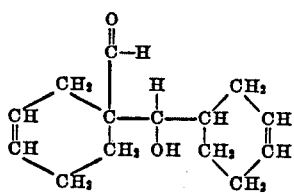

On reduction, the above compound yields a polynuclear compound containing a plurality of hydroxy groups which may be esterified or etherified to yield valuable novel compounds.

The aldol condensation of Δ³-tetrahydrobenzaldehyde may be effected conveniently employing a suitable alkali such as sodium hydroxide or potassium hydroxide to aid the condensation. Advantageously, from 5 to 15 parts by weight of alkali, to 100 parts of Δ³-tetrahydrobenzaldehyde, are employed and, preferably, the alkali is added in the form of a solution in a suitable organic solvent, e. g. ethyl alcohol or the like. The Δ³-tetrahydrobenzaldehyde is placed in a suitable vessel equipped with a stirrer and the alkali solution added slowly while the mixture is stirred. The condensation to Δ³-tetrahydrobenzaldol takes place rapidly with the evolution of heat. The temperature is maintained below about 65° C. during the condensation by applying suitable cooling means and, at the completion of the condensation, the polymer is obtained in the form of a liquid. The aldol is washed twice with an equal volume of water. The water layer is discarded, and the aldol is taken up in twice its volume of ether. The ether solution is dried with anhydrous sodium sulfate and filtered. The resulting mixture is heated to drive off the ether.

In order further to illustrate our invention but without being limited thereto the following example is given:

Example 400 parts by weight of Δ³-tetrahydrobenzaldehyde, prepared by the Diels-Alder condensation of acrolein and butadiene, are placed in a vessel equipped with a suitable stirrer and a saturated solution of sodium hydroxide in 95% ethyl alcohol is added slowly with constant stirring. The temperature rises during the condensation but is kept below about 65° C. during the course of the reaction. The product obtained comprises Δ³-tetrahydrobenzaldol.

The valuable Δ³-tetrahydrobenzaldol may also be oxidized to yield high molecular weight acids which may be employed in the synthesis of various other high molecular weight derivatives.

It is to be understood that the foregoing detailed description is given merely by way of illustration and that many variations may be made therein without departing from the spirit of our invention.

Having described our invention, what we desire to secure by Letters Patent is:

As a new compound, Δ³-tetrahydrobenzaldol,

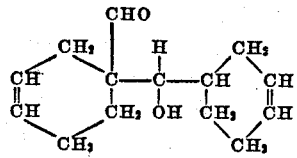

JOSEPH E. BLUDWORTH.
DONALD P. EASTER.

REFERENCES CITED

The following references are of record in the file of this patent:

Bate, "The Synthesis of Benzene Derivatives," page 192 (1926).

Diels et al., "Liebig's Annalen der Chemie," vol. 460, pages 98–122 (1928).